(12) United States Patent
Takeshita (10) Patent No.: US 8,439,328 B2
(45) Date of Patent: May 14, 2013

(54) FLUID CONTROL VALVE AND FUEL CELL SYSTEM

(75) Inventor: Masahiro Takeshita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 999 days.

(21) Appl. No.: 12/513,587

(22) PCT Filed: Nov. 7, 2007

(86) PCT No.: PCT/JP2007/072052
§ 371 (c)(1),
(2), (4) Date: May 5, 2009

(87) PCT Pub. No.: WO2008/069007
PCT Pub. Date: Jun. 12, 2008

(65) Prior Publication Data
US 2010/0035117 A1 Feb. 11, 2010

(30) Foreign Application Priority Data
Dec. 7, 2006 (JP) .................................. 2006-330184

(51) Int. Cl.
*F16K 31/00* (2006.01)

(52) U.S. Cl.
USPC ............................ 251/63.6; 251/368; 429/443

(58) Field of Classification Search ................ 251/61.5, 251/61.4, 61.2, 61.1, 63.6, 63.5, 331, 368; 429/443, 429/446; 137/487.5, 492.5, 489.5
See application file for complete search history.

(56) References Cited

U.S. PATENT DOCUMENTS

| | | | |
|---|---|---|---|
| 2,610,819 A | | 9/1952 | Sutton |
| 3,175,473 A | * | 3/1965 | Boteler et al. .................. 92/128 |
| 3,719,343 A | * | 3/1973 | Werra .......................... 251/61.1 |
| 3,838,707 A | * | 10/1974 | Wachowitz, Jr. .............. 137/312 |

(Continued)

FOREIGN PATENT DOCUMENTS

| | | |
|---|---|---|
| DE | 1 895 441 U | 6/1964 |
| DE | 1 988 030 U | 6/1968 |

(Continued)

OTHER PUBLICATIONS

Office Action issued in the related Chinese Application on Aug. 4, 2010 and English translation thereof.

(Continued)

*Primary Examiner* — John Bastianelli
*Assistant Examiner* — Andrew J Rost
(74) *Attorney, Agent, or Firm* — Kenyon & Kenyon LLP (57) ABSTRACT

An inlet shut valve or an outlet shut valve has a main diaphragm and a sub-diaphragm, wherein a valve closing pressure chamber and a valve opening pressure chamber are provided, respectively, on the upper surface side and the lower surface side of the main diaphragm. Furthermore, an atmospheric pressure chamber and a pressure chamber constituting a channel are provided, respectively, on the upper surface side and the lower surface side of the sub-diaphragm. A drive shaft constituting a valve element is driven in the direction for bringing about a valve open state by both forces, i.e. a first force acting by pressure difference between the valve closing pressure chamber and the valve opening pressure chamber and a second force acting by pressure difference between the atmospheric pressure chamber and the pressure chamber constituting a channel and acting in the same direction as the first force.

5 Claims, 4 Drawing Sheets

U.S. PATENT DOCUMENTS

| | | | |
|---|---|---|---|
| 4,310,141 A * | 1/1982 | Tamura | 251/28 |
| 4,872,638 A * | 10/1989 | Thompson et al. | 251/54 |
| 5,002,086 A * | 3/1991 | Linder et al. | 137/312 |
| 5,348,036 A * | 9/1994 | Oksanen et al. | 137/1 |
| 5,771,884 A * | 6/1998 | Yarnall et al. | 128/205.24 |
| 6,932,318 B2 * | 8/2005 | Igarashi | 251/60 |
| 7,028,706 B2 * | 4/2006 | Ando | 137/487.5 |
| 7,278,441 B2 * | 10/2007 | Tanikawa et al. | 137/270 |
| 7,311,292 B2 * | 12/2007 | Fedegari | 251/63.5 |

FOREIGN PATENT DOCUMENTS

| | | |
|---|---|---|
| DE | 24 29 448 A1 | 1/1976 |
| DE | 38 08 478 C2 | 12/1995 |
| DE | 100 50 981 A1 | 4/2002 |
| DE | 101 30 956 B4 | 2/2005 |
| EP | 1 544 526 B1 | 1/2010 |
| JP | 61-218873 A | 9/1986 |
| JP | 63-120977 A | 5/1988 |
| JP | 63-186965 | 11/1988 |
| JP | 10-153268 A | 6/1998 |
| JP | 11-37329 A | 2/1999 |
| JP | 2004-100889 A | 4/2004 |
| JP | 2004-183713 A | 7/2004 |
| JP | 2004-185831 A | 7/2004 |
| JP | 2004-185872 A | 7/2004 |
| JP | 2004-316679 A | 11/2004 |
| JP | 2005-150090 A | 6/2005 |
| JP | 2008-130237 A | 6/2008 |

OTHER PUBLICATIONS

Office Action issued in the related Japanese Application No. 2008-548210 on Nov. 8, 2011 and English translation thereof.

Office Action issued in German Application No. 11 2007 002 889.0 on Apr. 10, 2012 and English translation thereof.

* cited by examiner

FLUID CONTROL VALVE AND FUEL CELL SYSTEM

This is a 371 national phase application of PCT/JP2007/072052 filed 7 Nov. 2007, claiming priority to Japanese Patent Application No. JP 2006-330184 filed 7 Dec. 2006, the contents of which are incorporated herein by reference.

TECHNICAL FIELD

The present invention relates to a fluid control valve which includes a valve member having a drive shaft and which blocks and connects flows within a flow path by displacement of the drive shaft along the axis direction. The present invention further relates to a fuel cell system including the fluid control valve.

TECHNICAL BACKGROUND

A fuel cell system includes a fuel cell that generates electricity by an electrochemical reaction between fuel gas and oxidation gas (reaction gases), a gas supply flow path for supplying the reaction gases to the fuel cell, and a gas discharge flow path for discharging the reaction gases from the fuel cell. In addition, a open/close valves for a fuel cell equivalent to the fluid control valves can be installed in such a gas supply flow path and a gas discharge flow path.

For example, in a case of an open/close valve for the fuel cell disclosed in JP 2004-183713 A, a valve member having a pillar section is provided in order to block and connect flow in a gas flow path by displacing the pillar section along the axis direction. The inside of this open/close valve for the fuel cell is divided into two chambers by a diaphragm. This valve is provided in a hydrogen discharge unit for discharging hydrogen to be discharged from the fuel cell, and one chamber of the two chambers of the valve is connected to a path which is branched from an air supply path for supplying the air to the fuel cell. The other chamber of the two chambers has a coil spring, and the coil spring urges the valve member to open the other chamber and discharge hydrogen gas to be discharged. When the one chamber is supplied with air upon use, pressure acts on the diaphragm to cause the valve member to be seated on a valve seat against the resilience of the coil spring, thereby closing the other chamber.

Further, in the case of the fuel cell hydrogen regulator valve disclosed in JP 2004-150090 A, the inside of the housing is divided into three chambers by two diaphragms connected to the valve member, to thereby make the opening of the valve adjustable according to the air pressure supplied and introduced into a regulator chamber of the three chambers, the pressure from the spring, and the pressure from hydrogen gas.

In the case of the valve for a fuel cell disclosed in JP 2004-183713 A, a flow path for discharging hydrogen to be discharged is closed by supplying the air into one of two chambers. In other words, the flow path is blocked by the pressure difference between the two chambers. Further, when opening the valve, only the pressure difference between the two chambers and the resilience of the spring are used to drive the valve to connect the flow paths. As such, there is demand for improving the responsiveness of the driven valve.

For example, when this valve for a fuel cell is used in an environment in which moisture is present, moisture adhering to the valve member portion may freeze when the valve is closed, possibly making it necessary to apply a large force to open the valve. In contrast to this, when the flows of gas in the flow path is blocked or connected using only the force of the pressure differential between the two chambers and the resilience of the spring, the valve driving force may be reduced. As such, a configuration in which the response of the valve when it is driven in response to input of signals for driving the valve is improved has been desired.

Further, in the fuel cell valve disclosed in JP 2005 150090 A, three chambers are provided. Because the center chamber is an atmospheric pressure chamber, and because positive pressure acts on the two chambers on both sides, the force for driving the valve member generated by introducing the supplied air pressure into a regulator chamber of the two chambers and the force for driving the valve member generated by the pressure from hydrogen gas present in, of the two chambers, one chamber for discharging hydrogen to be discharged, act in the opposite directions to each other. As such, there is a demand for improving the response of the driven valve.

A purpose of the present invention is to improve the response of the valve when it is driven in the fluid control valve and in the fuel cell system.

DISCLOSURE OF THE INVENTION

A fluid control valve according to the present invention is a fluid control valve which includes a valve member having a drive shaft and which blocks or connects the flow in a flow path by a displacement of the drive shaft, and, in this fluid control valve, the drive shaft is driven by both a first force acting due to a pressure difference between a first pressure chamber and a second pressure chamber that are separated from each other, and a second force acting in the same direction as the first force and acting due to a pressure difference between a third pressure chamber and a fourth pressure chamber that are separated from each other.

Preferably, one of the first pressure chamber, the second pressure chamber, the third pressure chamber, and the fourth pressure chamber serves as a flow path in which flows are blocked or connected by the valve member.

More preferably, one of the first pressure chamber and the second pressure chamber and one of the third pressure chamber and the fourth pressure chamber are communicated to each other or are open to the atmosphere.

Preferably, in the fluid control valve according to the present invention, any two of the first pressure chamber, the second pressure chamber, the third pressure chamber, the fourth pressure chamber are not communicated to each other inside the valve.

Preferably, in the fluid control valve according to the present invention, one of the first pressure chamber and the second pressure chamber serves as a flow path in which flows are blocked or connected by the valve member, while the other one of the first pressure chamber and the second pressure chamber is open to the air, and one of the third pressure chamber and the fourth pressure chamber receives pressure from a fluid that is the same as a fluid that flows in the flow path, while the other one of the third pressure chamber and the fourth pressure chamber is open to the atmosphere.

Preferably, the fluid control valve according to the present invention is a normally open shut valve which is set in a valve open state in a normal state in which the first pressure chamber, the second pressure chamber, the third pressure chamber, and the fourth pressure chamber are all at the same pressure.

Preferably, the fluid control valve according to the present invention is a normally closed shut valve which is set in a valve closed state due to the resilience provided by a resilient means in a normal state in which the first pressure chamber, the second pressure chamber, the third pressure chamber, and the fourth pressure chamber are all at the same pressure, and the drive shaft is driven in a direction toward a valve open state by the first force and the second force acting in the same direction.

Preferably, the fluid control valve according to the present invention is used as an open/close valve for a fuel cell in a flow path through which oxidation gas related gas or fuel gas related gas flows.

When the fluid control valve is used as the open/close valve for the fuel cell in the flow path through which oxidation gas-related gas or fuel gas-related gas flows, preferably, the drive shaft is driven in a direction toward the valve open state by the first force and the second force acting in the same direction, and a fuel cell side of the flow path is positioned on the front side in a direction along which the drive shaft is driven from the valve open state toward the valve closed state.

Preferably, in the fluid control valve according to the present invention, an open area of the flow path is adjustable.

Preferably, in the fluid control valve according to the present invention, a member constituting the first pressure chamber and a member constituting the second pressure chamber are made of different metals.

The fuel cell system according to the present invention is a fuel cell system in which a fuel cell for generating electricity through an electrochemical reaction between an oxidation gas and a fuel gas is provided, and an open/close valve for the fuel cell in a flow path through which oxidation gas related gas or fuel gas related gas flows is a fluid control valve as above.

Because, in the fluid control valve and the fuel cell system according to the present invention, the drive shaft of the valve member is driven by both a first force acting due to the pressure difference between the first pressure chamber and a second pressure chamber that are separated from each other, and the second force acts in the same direction as the first force and acts due to the pressure difference between the third pressure chamber and the fourth pressure chamber that are separated from each other, it is possible to improve the responsiveness of the driven valve.

Further, when the first pressure chamber, the second pressure chamber, the third pressure chamber, and the fourth pressure chamber are provided along the axis direction of the drive shaft, the force for driving the valve can be increased without increasing the size of the respective pressure chambers. In a conventional fluid control valve in which the valve is driven only by a pressure difference between two pressure chambers, in order to increase the force for driving the valve, it is necessary to increase the inner diameter of one pressure chamber and increase the diameter of a diaphragm between the two pressure chambers to thereby increase a pressure-receiving area of the diaphragm. However, in this case, the diameter of the pressure chamber becomes larger, resulting in a larger fluid control valve. The larger fluid control valve may cause an increase in weight or cause unsuccessful installation on a vehicle. In contrast to this, in the fluid control valve according to the present invention, when the first pressure chamber, the second pressure chamber, the third pressure chamber, and the fourth pressure chamber are provided along the axis direction of the drive shaft, it is possible to increase the force for driving the valve without excessively increasing the inner diameter of the respective pressure chambers.

Further, with a configuration in which one of the first pressure chamber, the second pressure chamber, the third pressure chamber, and the fourth pressure chamber serves as a flow path in which flows are blocked or connected by the valve member, it is possible to facilitate achievement of a smaller fluid control valve, unlike when a flow path in which flows are blocked or connected by the valve member is provided in addition to the first pressure chamber, the second pressure chamber, the third pressure chamber, and the fourth pressure chamber.

Further, with a configuration in which the fluid control valve is a normally closed shut valve which is set in a valve closed state due to the resilience provided by a resilient means in a normal state in which the first pressure chamber, the second pressure chamber, the third pressure chamber, and the fourth pressure chamber are all at the same pressure, and in which the drive shaft is driven in a direction toward a valve open state by the first force and the second force acting in the same direction, the advantage of the present invention obtained by adopting the configuration of the present invention becomes greater. In other words, the valve open state is effectively realized by the first force and the second force even when the drive shaft needs to be displaced against the resilience of the resilient means. As such, the advantage of the present invention obtained by adopting the configuration of the present invention becomes greater.

Further, according to a configuration in which the fluid control valve is used as an open/close valve for the fuel cell in the flow path through which oxidation gas-related gas or fuel gas-related gas flows; the drive shaft is driven along the direction toward the valve open state by the first force and the second force acting in the same direction; and the fuel cell side of the flow path is positioned on the front side in the direction along which the drive shaft is driven from the valve open state toward the valve closed state, the advantage of the present invention obtained by adopting the configuration of the present invention becomes greater. Because the fuel cell side of the fluid control valve is negatively pressurized when oxygen or hydrogen is consumed by electricity generation in the fuel cell, the drive shaft must be displaced against the negative pressure in order to set the fluid control valve from the valve closed state to the valve open state. With the above configuration, even when it is necessary to displace the drive shaft against the negative pressure, it is possible to effectively realize the valve open state by the first force and the second force. As such, the advantages obtained by adopting the configuration of the present invention becomes greater.

According to a configuration in which the open area of the flow path is adjustable, it is possible to use the fluid control valve as a valve serving as both a regulator valve for a fuel cell and an air shut-off valve for a fuel cell in a flow path through which oxidation gas-related gas flows. As such, if the air shut-off valve for enabling the open area of the flow path to be adjusted is provided in the oxidation gas-related gas discharge flow path for discharging the oxidation gas-related gas from the fuel cell, there is no need to provide another regulator valve in the oxidation gas-related gas discharge flow path, thereby reducing cost.

Further, with the configuration in which the member constituting the first pressure chamber and the member constituting the second pressure chamber are made of different metals, even if the fluid control valve is used in a situation in which the fluid control valve may get wet, such as when it is mounted underneath a vehicle, it is still possible to achieve improvement in both water resistance and weight reduction.

DESCRIPTION OF EXEMPLARY EMBODIMENTS

First Embodiment

Figure 1:
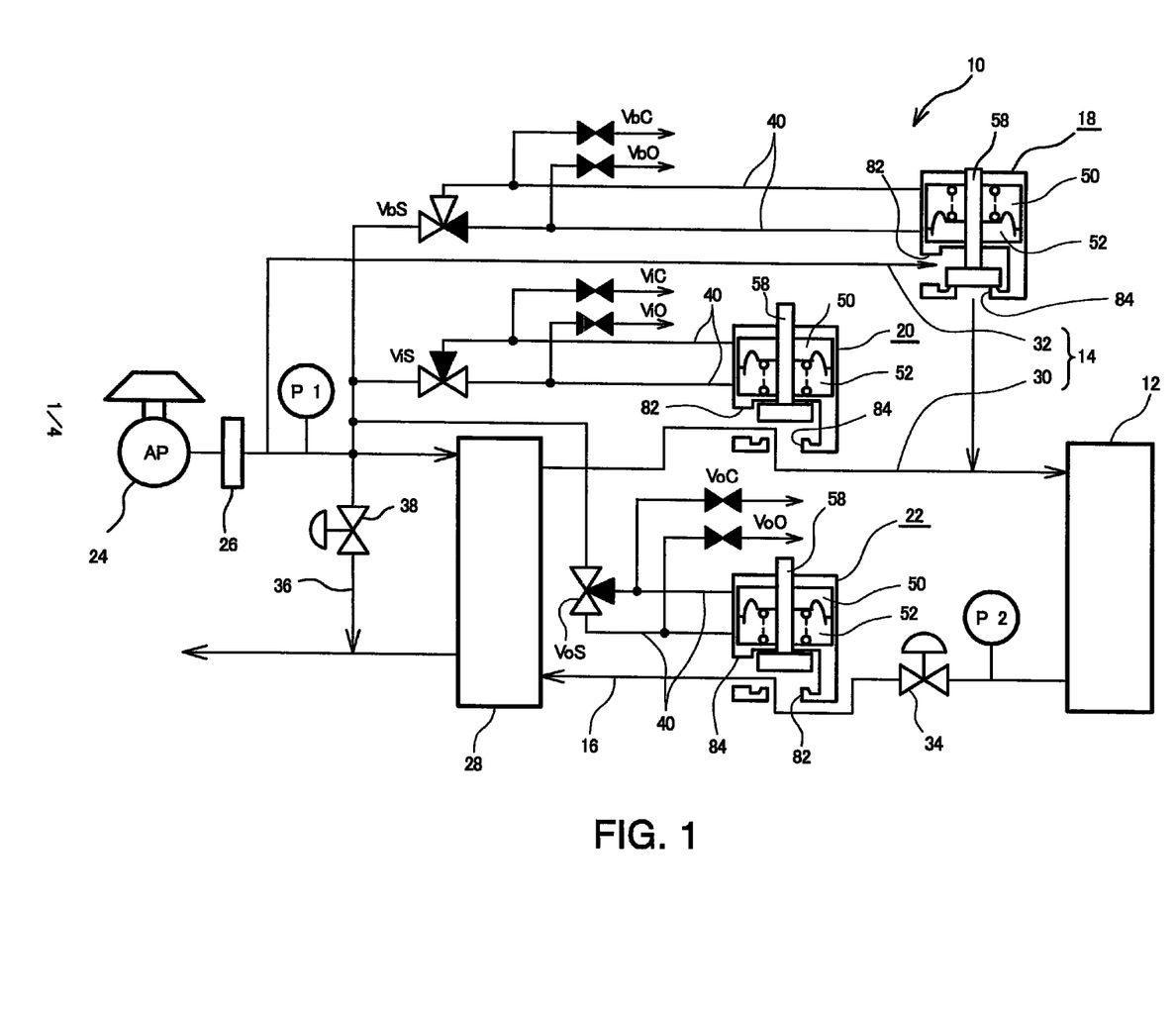
FIG. 1 illustrates a basic configuration of a fuel cell system according to a first embodiment of the present invention.

An embodiment of the present invention will be described below based on the drawings. FIG. 1 shows a schematic diagram of a fuel system according to the present embodiment. A fuel cell system 10 includes a fuel cell stack 12, an oxidation gas supply flow path 14, an oxidation gas-related-discharge flow path 16, a humidifier bypass valve 18, an inlet shut-off valve 20, and an outlet shut-off valve 22.

The fuel cell stack 12 generates electricity through an electrochemical reaction between oxygen and hydrogen. In other words, by supplying hydrogen gas as fuel gas and air as oxidation gas to the fuel cell stack 12, it is possible to obtain, in a plurality of fuel cells (not shown) of the fuel cell stack 12, electrical energy from an electrochemical reaction between oxygen and hydrogen. The fuel cell has, for example, a membrane-electrode assembly configured such that an electrolyte membrane is tightly held between an anode electrode and a cathode electrode, and separators on both ends of the membrane-electrode assembly.

The fuel cell system 10 according to the present embodiment is installed in a vehicle such as, for example, a fuel cell car, and the fuel cell stack 12 is used as a power supply for a vehicle driving motor. Naturally, it is also possible for the fuel cell system according to the present embodiment to be used for purposes other than driving a vehicle.

The oxidation gas supply flow path 14 is provided in order to supply air as the oxidation gas to the fuel cell stack 12. An air compressor 24 and an intercooler 26 are provided on the gas upstream side of the oxidation gas supply flow path 14. The air compressed by the air compressor 24 is cooled in the intercooler 26 and then humidified in the humidifier 28 to be supplied to the flow path on the cathode electrode side the fuel cell stack 12.

Further, in addition to a main path 30 directing the air through the humidifier 28 and on to the fuel cell stack 12, a humidifier bypass path 32 is provided in parallel with the main path 30 with respect to gas flow. The air passing through the humidifier bypass path 32 is supplied to the fuel cell stack 12 without passing through the humidifier 28. A humidifier bypass valve 18 is provided in the humidifier bypass path 32.

In addition, an oxidation gas-related-discharge flow path 16 is provided in order to discharge from the fuel cell stack 12 air off-gas which is the air that has been supplied to the fuel cell stack 12 and used in the electrochemical reaction in each fuel cell. The air off-gas discharged through the oxidation gas-related-discharge flow path 16 is transmitted to the humidifier 28 via a regulator valve 34 and then discharged into the atmosphere via a diluter (not shown). The regulator valve 34 is controlled so that the pressure of the air discharged from the fuel cell stack 12 (back pressure) becomes an appropriate pressure value according to an operation state of the fuel cell stack 12. That is, the pressure of the air at the location of a pressure sensor P2 in the oxidation gas-related-discharge flow path 16 is adjusted by the valve opening of the regulator valve 34. Further, the humidifier 28 serves to supply the moisture obtained from the air discharged from the fuel cell stack 12 to the air before being supplied to the fuel cell stack 12 to thereby humidify the air.

Although a hydrogen gas supply flow path for supplying hydrogen gas and a hydrogen gas-related-discharge flow path for discharging hydrogen gas related gas are both connected to the fuel cell stack 12, they are not shown in FIG. 1.

Further, a fuel cell bypass path 36 is connected between the upstream side connection point of the humidifier bypass path 32 and the humidifier 28 along the main path 30 of the oxidation gas supply flow path 14 and on the gas downstream side of the humidifier 28 along the oxidation gas-related-discharge flow path 16, so that the fuel cell bypass path 36 is in parallel with the fuel cell stack 12 with respect to the gas flow. A fuel cell bypass valve 38 is provided in the fuel cell bypass path 36. The fuel cell bypass valve 38 is used to control the pressure of the air supplied to the fuel cell stack 12. That is, the pressure of the air at the inlet pressure sensor P1 of the oxidation gas supply flow path 14 is adjusted by the opening of the fuel cell bypass valve 38. It is also possible to adjust the air pressure at the inlet pressure sensor P1 by adjusting the flow rate of the air discharged from the air compressor 24. Naturally, it is also possible to adjust the air pressure at the inlet pressure sensor P1 by controlling both the valve opening of the fuel cell bypass valve 38 and the flow rate of the air discharged by the air compressor 24.

Further, desirably, the fuel cell system 10 swiftly increases the temperature of the fuel cell stack 12 startup in cold conditions, such as when the air temperature is below freezing (below the freezing point of water). For this purpose, in comparison with the amount of hydrogen gas supplied to the fuel cell stack 12, the amount of air is reduced to be smaller than the amount normally used in a reaction with hydrogen gas for generation of electricity. That is, by reducing the cathode stoichiometric ratio and by generating electricity at a lower efficiency, the temperature of the fuel cell stack 12 swiftly increases. However, in this case, hydrogen may penetrate through the electrolyte membrane from the flow path on the anode side of the fuel cell stack 12 and flow into the flow path on the cathode side, to thereby increase the hydrogen concentration in the oxidation gas-related-discharge flow path 16. In such a case, the above fuel cell bypass valve 38 is set in an open state and can be used to lower the hydrogen concentration in the oxidation gas-related-discharge flow path 16 using the air that does not pass through the fuel cell stack 12. In addition, the concentration of hydrogen present in the hydrogen gas related gas discharged from the fuel cell stack 12, which is so-called hydrogen off-gas, may be higher than usual. In such a case, the above fuel cell bypass valve 38 can be set in the open state and can also be used to increase the amount of air which is transmitted to the diluter without passing through the fuel cell stack 12 to thereby decrease the hydrogen concentration in the discharged gas.

Furthermore, the inlet shut-off valve 20 and the outlet shut-off valve 22 are respectively provided on the gas downstream side of the humidifier 28 along the main path 30 of the oxidation gas supply flow path 14 and on the gas upstream side of the humidifier 28 along the oxidation gas-related-discharge flow path 16. In the present embodiment, the above humidifier bypass valve 18, the inlet shut-off valve 20, and the outlet shut-off valve 22 refer to flow control valves according to the present invention and correspond to open/close valves for the fuel cell recited in the claims.

That is, the humidifier bypass valve 18, the inlet shut-off valve 20, and the outlet shut-off valve 22 respectively serve as fluid control valves for adjusting the air flow in the humidifier bypass path 32, the main path 30, and the oxidation gasrelated-discharge flow path 16. Each of these valves 18, 20, and 22 is connected, via a pressure control flow path 40, to three PSVs (pressure switching valves), each being a solenoid valve.

In other words, the humidifier 18 is connected to three PSVs including VbS, VbC, and VbO. Further, the inlet shut-off valve 20 is connected to three PSVs including ViS, ViC, and ViO, while the outlet shut-off valve 22 is connected to three PSVs including VoS, VoC, and VoO. These PSVs are connected, for example, between the air compressor 24 and the humidifier 28, on the gas upstream side along the main path 30 of the oxidation gas supply flow path 14 via the pressure control flow paths 40. These PSVs are controlled by a controller such as an ECU (electric control unit)(not shown).

The drive of the humidifier bypass valve 18, the inlet shut-off valve 20, and the outlet shut-off valve 22 is controlled by the corresponding PSVs according to the state of the fuel cell stack 12, etc.

Figure 2:
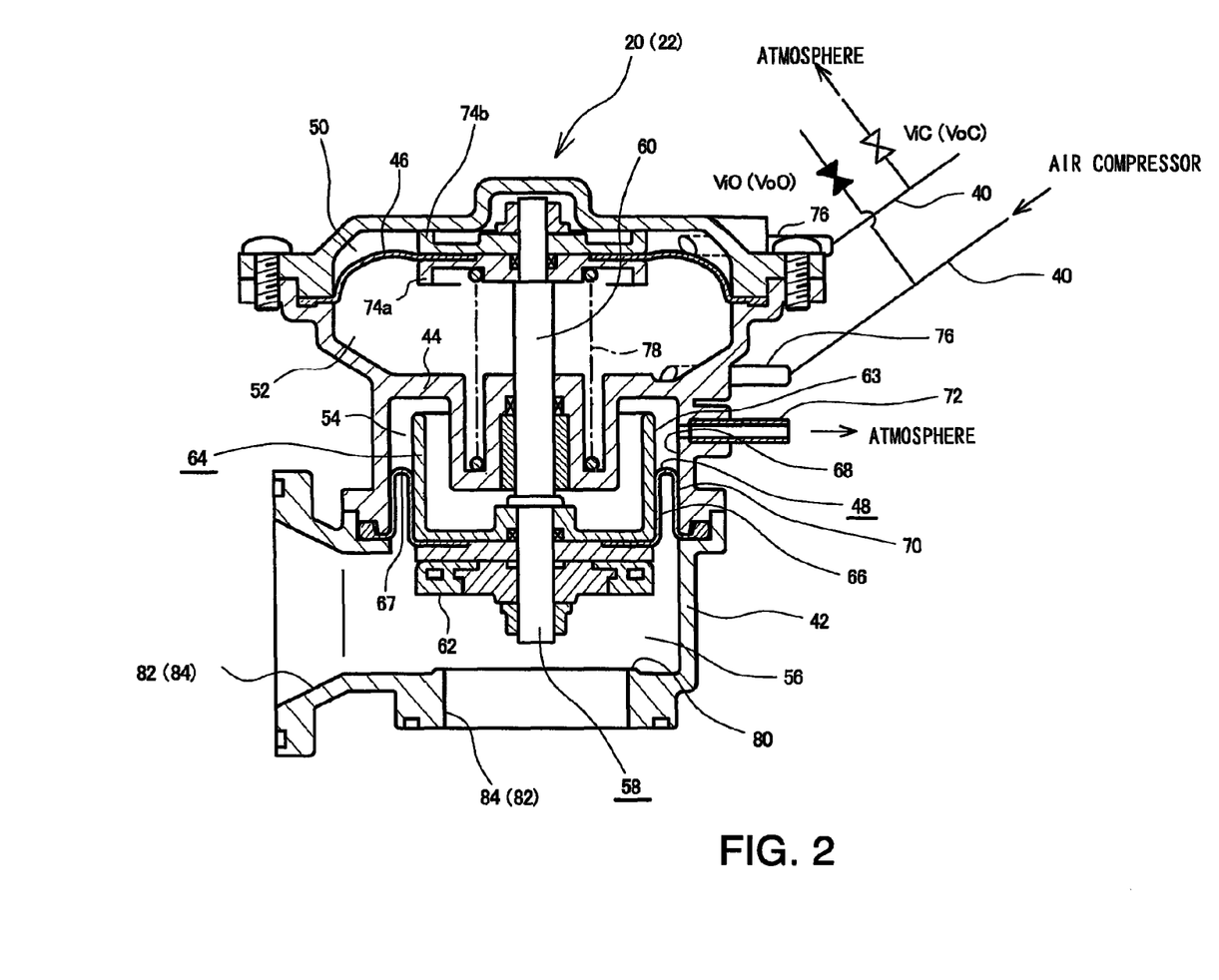
FIG. 2 illustrates a sectional view of a structure of an inlet shut-off valve (or an outlet shut-off valve) in an open state for use in the fuel cell system according to FIG. 1.
Figure 3:
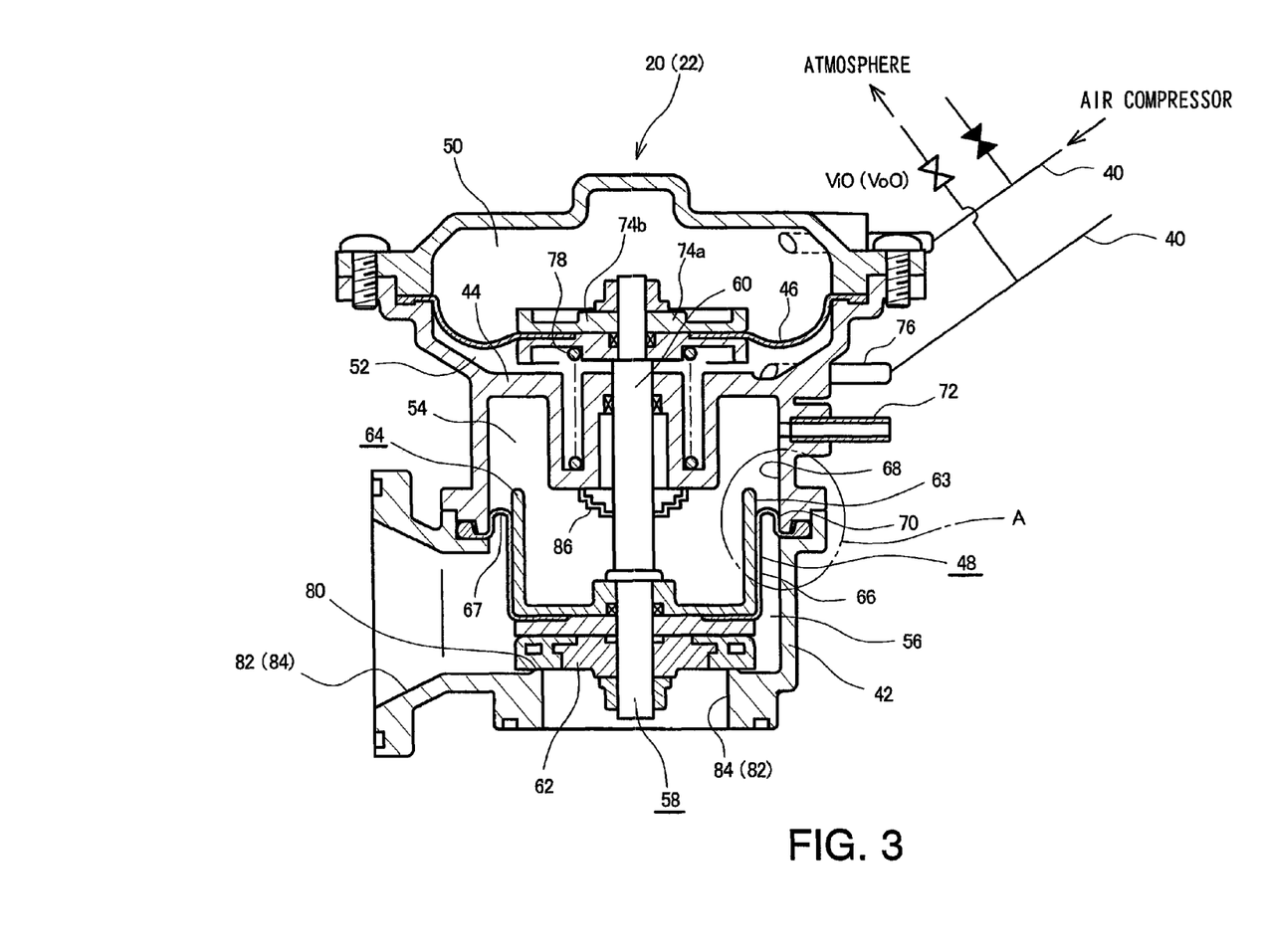
FIG. 3 illustrates a sectional view of a structure of the same inlet shut-off valve (or the outlet shut-off valve) in a closed state.

Referring to FIG. 2 and FIG. 3, the configurations and the actions of the inlet shut-off valve 20 and the outlet shut-off valve 22 will now be described by mainly referring to the inlet shut-off valve 20 as a representative case. The inlet shut-off valve 20 and the outlet shut-off valve 22 have the same configurations. The configuration of the humidifier bypass valve 18 will be described below.

As shown in FIG. 2, the inlet shut-off valve 20 is a normally open valve which opens the valve member and is in the valve open state in a normal state in which all the pressure chambers therein are at the same pressure.

Two top and bottom spaces are formed in the inlet shut-off valve 20 by dividing the inside of a housing 42 composed of a plurality of housing elements using a partition 44. By providing a main diaphragm 46 and a sub diaphragm 48 in the two spaces, respectively, there are provided a valve-closing pressure chamber 50 on the upper surface side of the main diaphragm 46, a valve-opening pressure chamber 52 on the bottom surface side of the main diaphragm 46, an atmospheric pressure chamber 54 on the upper surface side of the sub diaphragm 48, and a flow path forming pressure chamber 56 on the bottom surface side of the sub diaphragm 48. Among these, the flow path forming pressure chamber 56 corresponds to the first pressure chamber recited in the claims, while the atmospheric pressure chamber 54 corresponds to the second pressure chamber recited in the claims. Further, the valve-opening pressure chamber 52 corresponds to the third or the fourth pressure chamber recited in the claims, while the valve-closing pressure chamber 50 corresponds to the fourth or the third pressure chamber recited in the claims. The valve-closing pressure chamber 50, the valve-opening pressure chamber 52, the atmospheric pressure chamber 54, and the flow path forming pressure chamber 56 are separated from each other and any two of these pressure chambers 50, 52, 54, and 56 are not connected inside the inlet shut-off valve 20.

Further, the main diaphragm 46 and the sub diaphragm 48 are connected to a valve member 58. That is, the valve member 58 has a drive shaft 60 inside the housing 42, and is supported in the housing 42 such that the valve member 58 can be displaced along the axis direction of the drive shaft 60. A circular plate-shaped valve member body 62 is connected to the lower end portion of the drive shaft 60 within the valve member 58. In addition, a closed-end cylindrical shape tubular member 64 having a tubular surface portion 63 on the drive shaft side of its outer circumference is connected to the lower side portion of the drive shaft 60.

Further, by tightly holding the inner circumference end portion of the sub diaphragm 48 made of a resilient material (e.g., a rubber or an elastomer), specifically, ethylene-propylene rubber such as EPDM between the bottom surface of the bottom plate portion of the tubular member 64 and the upper surface of the valve member body 62 to thereby connect the inner circumference portion of the sub diaphragm 48 to the drive shaft 60. The outer circumference end portion of the sub diaphragm 48 is connected to the inner circumference portion of the housing 42 so as to be tightly held by two housing elements constituting the housing 42. As such, the upper side and the lower side of the space under the partition 44 in the housing 42 are separated into the atmospheric pressure chamber 54 and the flow path forming pressure chamber 56, respectively. The atmospheric pressure chamber 54 and the flow path forming pressure chamber 56 are shut off from each other in an airtight manner.

Further, a diaphragm side tubular portion 66 which is elastically deformed and pushed along the tubular surface portion 63 on the drive shaft side is provided at a portion of the sub diaphragm 48 toward the inner side from the central portion along the radial direction. Then, in the close valve state as shown in FIG. 3, the pressure from the flow path forming pressure chamber 56 is received at the bottom surface of an annular deformable portion 67 of the sub diaphragm 48 which is curved upwardly between the tubular surface portion 63 on the drive shaft side of the tubular member 64 and the inner surface of the housing 42. By receiving the pressure from the flow path forming pressure chamber 56 at the bottom surface of the annular deformable portion 67, as shown in FIG. 2, the drive shaft 60 is displaced while elastically deforming the upper portion of the diaphragm side tubular portion 66 to be pulled off from the tubular surface portion 63 on the drive shaft side.

Further, a second diaphragm side tubular portion 70 which is elastically deformed so as to be pushed along a housing side tubular surface portion 68 on the inner surface of the housing 42 is provided at a portion toward the outer side of the radially central portion of the sub diaphragm 48. When the drive shaft 60 is displaced downward as shown in FIG. 3 from the open valve state as shown in FIG. 2, the second diaphragm side tubular portion 70 is elastically deformed such that the top portion of the second diaphragm side tubular portion 70 is pulled off from the housing tubular surface portion 68.

The flow path forming pressure chamber 56 constitutes a part of the oxidation gas supply flow path 14 (see FIG. 1) (oxidation gas-related-discharge flow path 16 in for the outlet shut-off valve 22), and upstream and downstream portions of the flow path forming pressure chamber 56 connected and disconnected by the valve member 58. Further, as the atmospheric pressure chamber 54 is connected to an atmosphere communicating tube 72 having one end communicated to the atmosphere, the atmospheric pressure chamber 54 is open to the atmosphere.

Further, the top end portion of the valve member 58 is connected to two approximately disc-shaped presser members 74a and 74b, and the inner circumference end portions of the main diaphragm 46 made of a resilient material including elastomer and the like such as rubber and, specifically, ethylene-propylene rubber such as EPDM is tightly held between the two presser members 74a and 74b. The outer circumference end portion of the main diaphragm 46 is connected to the inner circumference portion of the housing 42 so as to be tightly held by two housing elements constituting the housing 42. As such, the upper side and the lower side of the space above the partition 44 in the housing 42 are separated into the valve-closing pressure chamber 50 and the valve-opening pressure chamber 52, respectively. The valve-closing pressure chamber 50 and the valve-opening pressure chamber 52 are shut off from each other in an airtight manner. Further, the valve-closing pressure chamber 50 and the valve-opening pressure chamber 52 are connected to a supply and discharge tube 76.

Further, a coil spring 78 is provided as a resilient means between the partition 44 and the lower presser member 74a of the two presser members 74a and 74b to allow the valve member 58 to have resilience in the upper direction, that is, the direction toward the open valve state. By displacing the valve member 58 in the lower direction, the bottom surface of the valve member body 62 is seated on a valve seat 80, and the flow path is shut off. In other words, flows into the flow path are blocked or connected by the displacement of the drive shaft 60 along the axis direction. In addition, the diameter of the pressure-receiving area of the upper side portion of the drive shaft 60 including the main diaphragm 46 is made sufficiently larger than the diameter of the pressure-receiving area of the lower side portion of the drive shaft 60 including the sub diaphragm 48.

In such an inlet shut-off valve 20, the valve-closing pressure chamber 50 is connected to the pressure control flow path 40 on the side of ViC serving as the PSV via the supply and discharge tube 76 (FIG. 2 and FIG. 3). Further, the valve-opening pressure chamber 52 is connected to the pressure control flow path 40 on the side of ViO serving as the PSV via the supply and discharge tube 76. By the displacement of the drive shaft 60 along the axis direction, the center portion of the main diaphragm 46 is displaced so as to be curved up and curved down. Naturally, it is also possible to adopt a configuration in which the entire main diaphragm 46 moves in the up-and-down direction.

As shown in FIG. 2, when the valve member 58 is driven upward by the displacement of the drive shaft 60, the air flowing from the upstream side of the oxidation gas supply flow path 14 (FIG. 1) to the inlet 82 of the inlet shut-off valve 20 is discharged to the fuel cell stack 12 side (FIG. 1) from an outlet 84 of the inlet shut-off valve 20. Meanwhile, as shown in FIG. 3, when the valve member 58 is driven downward by the displacement of the drive shaft 60, the outlet 84 is blocked, and the air flowing from the upstream side of the oxidation gas supply flow path 14 toward the fuel cell stack 12 is shut off.

As shown in FIG. 1, in the outlet shut-off valve 22, the inlet 82 and outlet 84 are inverted from those in the inlet shut-off valve 20. When the valve member 58 is driven upward by the displacement of the drive shaft 60, air off-gas flowing from the upstream side of the oxidation gas-related-discharge flow path 16 toward the inlet 82 of the output shut-off valve 22 is discharged to the humidifier 28 side from the outlet 84 of the outlet shut-off valve 22. Meanwhile, when the valve member 58 is driven downward by the displacement of the drive shaft 60, the inlet 82 is blocked, and the air off-gas flowing from the upstream side of the oxidation gas-related-discharge flow path 16 toward the humidifier 28 is shut off.

The displacement of the drive shaft 60 along the axis direction is controlled by the three PSVs. That is, for the inlet shut-off valve 20, three PSVs, that is, ViS, ViC, and ViO control the pressure in the valve-opening pressure chamber 52 and the valve-closing pressure chamber 50. Further, for the outlet shut-off valve 22, three PSVs, that is, VoS, VoC, and VoO control the pressure in the valve-opening pressure chamber 52 and the valve-closing pressure chamber 50.

As shown in FIG. 1, ViS (or VoS) is a three-way valve, that is, a three-way PSV which selectively connects one of the valve-closing pressure chamber 50 and the valve-opening pressure chamber 52 to the gas upstream side of the air compressor 24 and shuts off the other pressure chamber from the gas upstream side of the air compressor 24. In addition, all ViC, ViO, VoC, and VoO are two-way PSVs and serve as exhaust valves, that is, depressurizing valves.

Further, ViS (or VoS) changes the connection state of the flow path according to an energized state. ViS (or VoS) connects the gas discharge side of the air compressor 24 to the valve-opening pressure chamber 52 if the ViS (or VoS) is not energized (i.e., in a non-energized state). Further, ViS (or VoS) connects the gas discharge side of the air compressor to the valve-closing pressure chamber 50 if the ViS (or VoS) is energized (i.e., in an energized state). ViC, ViO, VoC, and VoO all close the valves in a non-energized state and open the valves in an energized state.

Further, in FIG. 1 to FIG. 3, among the plurality of triangles representing ViC, ViO, VoC, and VoO, the black triangles show a state in which the flow path is shut off, while the white triangles show a state in which flows in the flow path are connected.

In order to achieve the above configuration, when the inlet shut-off valve 20 (or the outlet shut-off valve 22) is open as shown in FIG. 2 from the valve closed state shown in FIG. 3, ViC (VoC) is set in the valve open state while ViS (or VoS) is set in the non-energized state (FIG. 1) to thereby open the valve-closing chamber 50 to the atmosphere. Then, the pressurized air is introduced into the valve-opening pressure chamber 52 via the supply and discharge tube 76 on the valve-opening pressure chamber 52 side (FIG. 2 and FIG. 3) and the pressure control flow path 40 by the air compressor 24 (FIG. 1). In this manner, a pressure difference is generated between the pressure of the valve-opening pressure chamber 52 and the pressure of the valve-closing chamber 50 (atmospheric pressure).

Further, because the pressurized air is also introduced into the flow path forming pressure chamber 56 shown in FIG. 3 from the air compressor 24 via the upstream side portion of the oxidation gas supply flow path 14, a pressure difference is generated between the pressure of the flow path forming pressure chamber 56 and the pressure of the atmospheric pressure chamber 54 communicated to the atmosphere. The pressure of the flow path forming pressure chamber 56 is applied on the bottom surface of the annular deformable portion 67 of the sub diaphragm 48 shown in FIG. 3. As such, when the sub diaphragm 48 pushes the tubular member 64 upward, the drive shaft 60 is displaced upward as shown in FIG. 2 and the cross section of the annular deformable portion 67 is upwardly curved higher. As a result, the drive shaft 60 is driven upward by both of force F1 acting on the drive shaft 60 upward due to the pressure difference between the flow path forming pressure chamber 56 and the atmospheric pressure chamber 54 and force F2 acting on the drive shaft 60 upward due to the pressure difference between the valve-closing pressure chamber 50 and the valve-opening pressure chamber 52, and the resilience of the coil spring 78. When the inlet shut-off valve 20 is fully opened as shown in FIG. 2, ViC (VoC) is set in the valve closed state, and the valve-closing pressure chamber 50 is shut off from the atmosphere. In addition, in this state, the upper presser member 74b of the two presser members 74a and 74b serves as a stopper stopping at the upper portion inside the housing 42.

Meanwhile, in order to close the inlet shut-off valve 20 as shown in FIG. 3 from the valve open state shown in FIG. 2, ViS (or VoS) is set in the energized state to introduce the pressurized air from the air compressor 24 into the valve-closing pressure chamber 50 via the supply and discharge tube 76 and the pressure control flow path 40. Further, ViO (VoO) is set in the valve open state to thereby open the valve-opening pressure chamber 52 to the atmosphere. As a result, due to the pressure differential generated between the pressure of the valve-closing pressure chamber 50 and the pressure of the valve-opening pressure chamber 52 (atmospheric pressure), third force F3 acts downward on the drive shaft 60. Meanwhile, because the air pressurized by the air compressor 24 is also introduced into the flow path forming pressure chamber 56 shown in FIG. 2, due to the pressure difference between the pressure of flow path forming pressure chamber 56 and the pressure of the atmospheric pressure chamber 54 communicated to the air, fourth force F4 acts upward on the drive shaft 60, that is, the opposite direction to the third force F3. However, in the present embodiment, the diameter of the pressure-receiving area of the upper side portion of the drive shaft 60 including the main diaphragm 46 is made sufficiently larger than the diameter of the pressure-receiving area of the lower side portion of the drive shaft 60 including the sub diaphragm 48. As such, as shown in FIG. 3, the drive shaft 60 is displaced downward against fourth force F4 and the resilience of the coil spring 78, and the valve member 62 is seated on the valve seat 80.

Then, while the inlet shut-off valve 20 is fully closed, ViS (or VoS) is set in the non-energized state to thereby shut off the valve-closing pressure chamber 50 from the air compressor 24 and maintain a constant level of air pressure inside the valve-closing pressure chamber 50. In this state, ViO (VoO) is set in the valve closed state to shut off the valve-opening pressure chamber 52 from the atmosphere. The opening and closing operation is also performed on the outlet shut-off valve 22 in a similar manner.

Meanwhile, the humidifier bypass valve 18 is normally kept in a closed state wherein the valve member 58 is closed under normal conditions in which all the pressure chambers provided therein are at the same pressure. Although the detailed structure of the humidifier bypass valve 18 is not illustrated in detail, this valve has a structure similar to the inlet shut-off valve 20 or the outlet shut-off valve 22 shown in FIG. 2 and FIG. 3, and the coil spring 78 (see FIG. 2 and FIG. 3) is provided between the upper surface of the bottom plate portion of the tubular member 64 and the bottom surface of the partition 44. Alternatively, the humidifier bypass valve 18 can be configured as a normally closed type shutoff valve that includes a coil spring provided between the tip surface of a member fixed to the upper end portion of the valve member 58 such as the presser member 74b (see FIG. 2 and FIG. 3) and the bottom surface of the housing 42 (see the schematic figure in FIG. 1).

Further, as shown in FIG. 1, in the humidifier bypass valve 18, the valve-closing pressure chamber 50 is connected to the pressure control flow path 40 on the VbC side of the PSV, while the valve-opening pressure chamber 52 is connected to the pressure control flow path 40 on the VbO side of the PSV.

When the valve member 58 is driven upward by the displacement of the drive shaft 60, the air flowing from the upstream side of the humidifier bypass path 32 toward the inlet 82 of the humidifier bypass valve 18 is discharged from the outlet 84 of the humidifier bypass valve 18 to the fuel cell stack 12 side. Meanwhile, when the valve member 58 is driven downward by the displacement of the drive shaft 60, the outlet 84 is blocked, and the air flowing from the upstream side of the humidifier bypass path 32 to the fuel cell stack 12 is shut off.

As in the inlet shut-off valve 20 and the outlet shut-off valve 22, the displacement of the drive shaft along the axis direction is controlled by the three PSVs, that is, VbS, VbC, and VbO. In FIG. 1, among the plurality of triangles representing VbS, VbC, and VbO, the black triangles show a state in which the flow path is shut off, while the white triangles show a state in which flows in the flow path are connected. Further, VbS connects the gas discharge side of the air compressor 24 to the valve-closing chamber 50 in the non-energized state and connects the gas discharge side of the air compressor 24 to the valve-opening chamber 52 in the energized state.

In order to open this humidifier bypass valve 18, the air pressurized by the air compressor 24 is introduced into the valve-opening pressure chamber 52, and the valve-closing pressure chamber 50 is open to the atmosphere. As a result, the drive shaft 60 (see FIG. 2 and FIG. 3) is driven upward, against the resilience of the coil spring, by both first force F1' acting on the drive shaft 60 upward due to the pressure difference between the flow path forming pressure chamber 56 to which the air pressurized by the air compressor 24 is introduced and the atmospheric pressure chamber 54 (see FIG. 2 and FIG. 3), and second force F2' acting on the drive shaft 60 upward due to the pressure difference between the valve-closing pressure chamber 50 and the valve-opening pressure chamber 52. The humidifier bypass valve 18 is thus opened.

Meanwhile, in order to close the humidifier bypass valve 18, the air pressurized by the air compressor 24 is introduced into the valve-closing pressure chamber 50, and the valve-opening pressure chamber 52 is open to the atmosphere. The drive shaft 60 is then driven downward by the downward force acting on the drive shaft 60 due to the pressure difference between the valve-closing pressure chamber 50 and the valve-opening pressure chamber 52, and by the resilience of the coil spring 78. Here, although the upward force acts on the drive shaft 60 due to the pressure difference between the flow path forming pressure chamber 56 and the atmospheric pressure chamber 54, the drive shaft 60 is displaced downward because the diameter of the pressure-receiving area of the upper side portion of the drive shaft 60 including the main diaphragm 46 (see FIG. 2 and FIG. 3) is made sufficiently larger than the diameter of the pressure-receiving area of the lower side portion of the drive shaft 60 including the sub diaphragm 48(see FIG. 2 and FIG. 3). The humidifier bypass valve 18 is thus closed.

By employing the above fuel cell system, it is possible to maintain all of the inlet shut-off valve 20, the outlet shut-off 22, and the humidifier bypass valve 18 in the valve closed state while the system is not operated and left to stand, that is, while all the sets of three PSVs, each set corresponding to the inlet shut-off valve 20, the outlet shut-off 22, and the humidifier bypass valve 18, are kept in the non-energized state. As such, it is possible to prevent fresh air from being supplied into the flow path in the cathode electrode side of the fuel cell stack 12. As such, it is possible to prevent the life of the fuel cell stack 12 from being shortened by an oxidized carbon member holding a catalyst constituting the membrane electrode assembly.

Specifically, in the present embodiment, each of the inlet shut-off valve 20, the outlet shut-off 22, and the humidifier bypass valve 18 has a configuration in which the valve member 58 having the drive shaft 60 is provided; the flows in the flow path are blocked or connected by the displacement of the drive shaft 60; and the drive shaft 60 is driven by both first force F1, F1' acting due to the pressure difference between the valve-closing pressure chamber 50 and the valve-opening pressure chamber 52 which are separated from each other, and second force F2, F2' acting in the same direction as first force F1, F1' and acting due to the pressure difference between the flow path forming pressure chamber 56 and the atmospheric pressure chamber 54 which are separated from each other. As such, it is possible to improve the response of the driven valve.

Further, because the valve-closing pressure chamber 50, the valve-opening pressure chamber 52, the atmospheric pressure chamber 54, and the flow path forming pressure chamber 56 are arranged along the axis direction of the drive shaft 60, it is possible to increase the force for driving the valve without excessively increasing the inside diameter of the respective pressure chambers 50, 52, 54, and 56.

Further, because the flow path forming pressure chamber 56 serves as the flow path that is blocked or connected by the valve member 58, it is possible to facilitate reduction of the size of the inlet shut-off valve 20, the outlet shut-off valve 22, and the humidifier bypass valve 18, unlike when a flow path which is blocked or connected by the valve member 58 is provided in addition to the pressure chamber 50, 52, 54, and 56.

Further, the humidifier bypass valve 18 is a normally closed valve which is set in the closed state by the resilience of the coil spring when all the pressure chambers 50, 52, 54, and 56 are at the same pressure, and, in the valve 18, the drive shaft 60 is driven along the direction toward the open valve state due to first force F1' and second force F2' both acting in the same direction. As such, the advantage obtained by adopting the configuration, wherein the valve member 58 having the drive shaft 60 is provided; the flows in the flow path are blocked or connected by the displacement of the drive shaft 60; and the drive shaft 60 is driven by both first force F1' acting due to the pressure difference between the valve-closing pressure chamber 50 and the valve-opening pressure chamber 52, which are separated from each other, and second force F2' acting in the same direction as first force F1 and acting due to the pressure difference between the flow path forming pressure chamber 56 and the atmospheric pressure chamber 54, which are separated from each other, becomes greater. In other words, even when it is necessary that the drive shaft 60 be displaced against the resilience of the coil spring in order to change the humidifier bypass valve 18 from the valve closed state to the valve open state, it is possible to effectively realize the valve open state by first force F1' and second force F2'. The advantages of adopting the above configuration becomes greater.

Further, each of the inlet shut-off valve 20, the outlet shut-off valve 22, and the humidifier bypass valve 18 comprises a tubular surface portion 63 provided on the drive shaft side of the outer circumference of the tubular member 64 fixed to the drive shaft 60, a housing 42, and a sub diaphragm 48 which is made of an elastic material and has an inner circumference portion connected to the drive shaft 60 and an outer circumference portion connected to the housing 42. Because, by receiving the pressure at the annular deformable portion 67 of the sub diaphragm 48, the drive shaft 60 is displaced while elastically deforming the sub diaphragm 48, it is possible to realize the gradual displacement of the drive shaft 60 due to the deformation resistance of the sub diaphragm 48 during the displacement of the drive shaft 60. In other words, it is possible to enable the sub diaphragm 48 receiving the pressure to have a function of slowing the displacement of the drive shaft 60, thereby reducing operational noise generated when the presser member 74b fixed to the valve member 58 comes into contact with the housing 42 during the displacement of the drive shaft 60.

Further, the inlet shut-off valve 20, the outlet shut-off valve 22, and the humidifier bypass valve 18 are used as valves for the fuel cell in the oxidation gas supply flow path 14 or in the oxidation gas-related-discharge flow path 16, and the drive shaft 60 is driven along the direction toward the valve open state by first force F1, F1' and second force F2, F2' both acting in the same direction. The flow path, that is, the flow path forming pressure chamber 56 on the fuel cell stack 12 side is positioned on the front side in a direction along which the drive shaft 60 is driven from the valve open state toward the valve closed state, that is, the lower side in FIG. 2 and FIG. 3. As such, the advantage obtained by adopting the configuration, wherein the valve member 58 having the drive shaft 60 is provided; and the flows in the flow path are blocked or connected by the displacement of the drive shaft 60; and the drive shaft 60 being driven by both first force F1, F1' acting due to the pressure difference between the valve-closing pressure chamber 50 and the valve-opening pressure chamber 52, which are separated from each other, and second force F2, F2' acting in the same direction as first force F1, F1' and acting due to the pressure difference between the flow path forming pressure chamber 56 and the atmospheric pressure chamber 54, which are separated from each other, becomes greater. In other words, when oxygen and hydrogen are consumed in the fuel cell stack 12 to generate electricity, the fuel cell stack sides of the valves 20, 22, and 18 become negatively pressurized. Therefore, in order to change the valves 20, 22, and 18 from the valve closed state to the valve open state, it is necessary that the drive shaft 60 be displaced against the negative pressure. In the above configuration, even when the drive shaft 60 must be displaced against the negative pressure, it is possible to effectively realize the valve open state by first force F1, F1' and second force F2, F2'. As such, the advantage of the present invention obtained by adopting the above configuration becomes greater.

As shown only in FIG. 3, it is also possible to more effectively prevent moisture from adhering to a sliding portion of, for example, a bearing portion between the drive shaft 60 and the housing 42 by providing a tubular sealing member 86 which is extendable along the axis direction between the circumference of the middle portion of the drive shaft 60 and the bottom surface of the partition 44. With such a configuration, it is possible to more effectively prevent disruption of smooth operation of the drive shaft due to frozen moisture adhering to the housing in a low temperature environment.

Further, in above embodiment, it is also possible to enable at least one of the inlet shut-off valve 20, the outlet shut-off valve 22, and the humidifier bypass valve 18 to have a function for not only blocking or connecting flows in the flow path but also adjusting an open area of the flow path to a desired size. For example, if a configuration in which the pressure of at least one pressure chamber among the valve-closing pressure chamber 50, the valve-opening pressure chamber 52, the atmospheric pressure chamber 54 in the valves 20, 22, 18, and the flow path forming pressure chamber 56 can be delicately adjusted is adopted, the open area of the flow path becomes adjustable by maintaining the drive shaft 60 in a half-open state, between the fully open state and the fully closed state of the valve. With such a configuration, if, for example, the outlet shut-off valve 22 serving as an air shut-off valve having a regulator function is provided in the oxidation gas-related-discharge flow path 16, it is not necessary to provide a different regulator valve 34 (FIG. 1) in the oxidation gas-related-discharge flow path 16, thereby achieving cost reduction.

The application of the fluid control valve according the present invention is not limited to the above inlet shut-off valve 20, the outlet shut-off valve 22, and the humidifier bypass valve 18, and the present invention is also applicable to, for example, a valve for a fuel cell in the fuel gas supply flow path or in the fuel gas-related-discharge flow path through which hydrogen gas as fuel gas-related gas flows.

Further, aside from the present invention, in another invention by the present inventor, one of the inlet shut-off valve 20, the outlet shut-off valve 22, and the humidifier bypass valve 18 according to the above embodiment employs a solenoid or a motor to drive the valve member 58 having the drive shaft 60 instead of providing the valve-opening pressure chamber 52 and the valve-closing pressure chamber 50, and the atmospheric pressure chamber 54 and the flow path forming pressure chamber 56 can be separated from each other using a diaphragm equivalent to the sub diaphragm 48 (see FIG. 2 and FIG. 3) in order to increase the force for driving the valve. In other words, it is also possible to adopt a fluid control valve in which a valve member 58 having a drive shaft 60 is provided; flows into the flow path are blocked or connected by the displacement of drive shaft along the axis direction; and the drive shaft 60 is driven by both a force F1 generated by the solenoid or the motor and a force F2 acting in the same direction as force F1 due to the pressure difference between the first pressure chamber and the second pressure chamber which are separated from each other.

Second Embodiment

Figure 4:
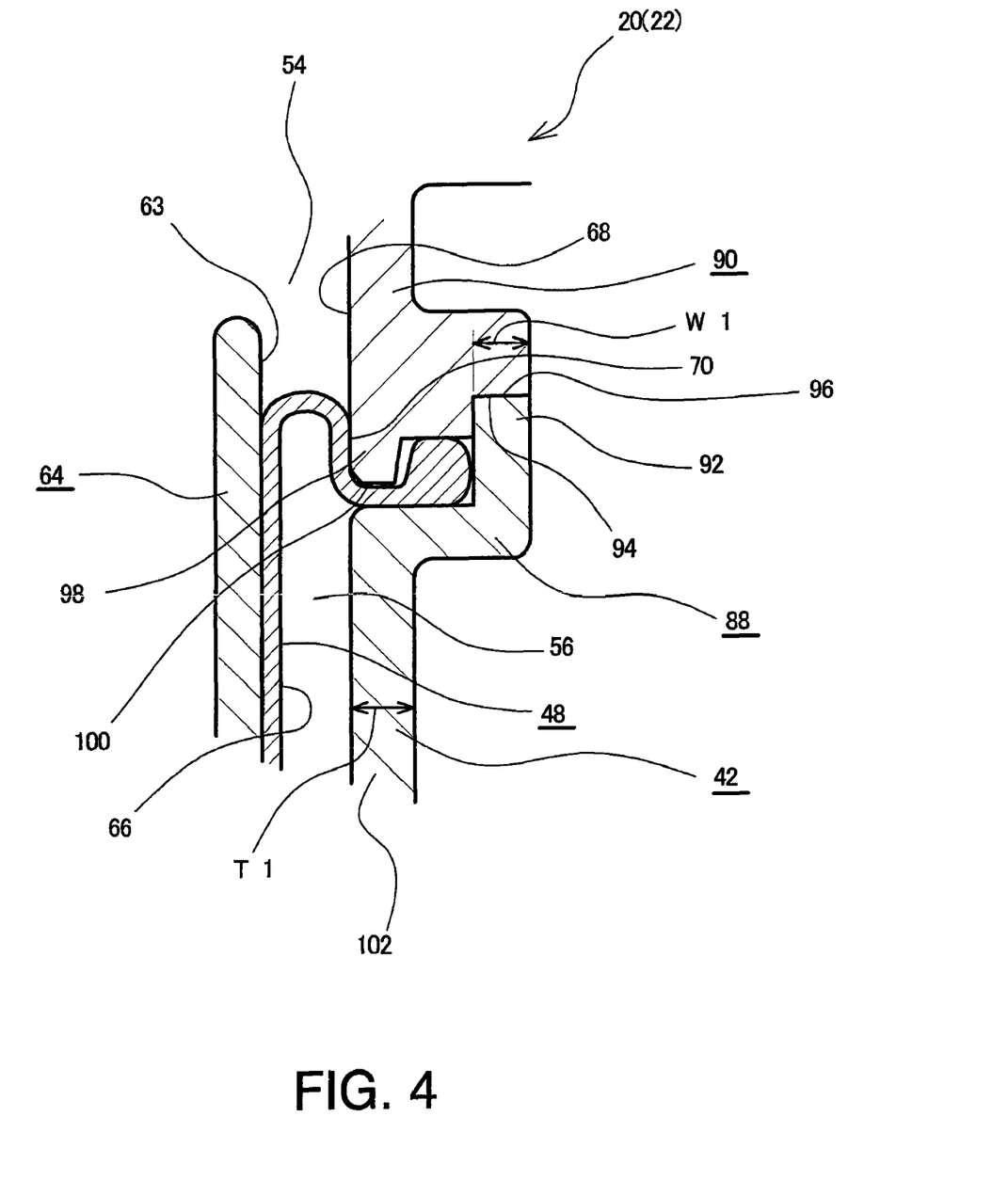
FIG. 4 is an enlarged figure of portion A of FIG. 3 showing an inlet shut-off valve (or an outlet shut-off valve) constituting a fuel cell system according to a second embodiment of the present invention.

FIG. 4 is an enlarged figure of portion A of FIG. 3 showing the inlet shut-off valve (or the outlet shut-off valve) constituting the fuel cell system according to the second embodiment of the present invention. As shown in FIG. 4, the sub-diaphragm 48 of the inlet shut-off valve 20 (or the outlet shut-off valve 22; hereinafter description regarding the "inlet shut-off valve 20" will be understood to also apply to the outlet shut-off valve 22) is connected to the drive shaft 60 (see FIG. 2 and FIG. 3) as in the above first embodiment. Further, the outer circumference end portion of the sub diaphragm portion 48 is tightly held by a first housing element 88 and a second housing element 90, which together constitute the housing 42. Further, the flow path forming pressure chamber 56 is provided inside the first housing element 88, while the atmospheric pressure chamber 54 is provided in the second housing element 90.

Further, the first housing element 88 and the second housing element 90 are connected by a fastening portion at which, for example, a bolt (not shown) inserted into a through-hole (not shown) in one of the first housing element 88 and the second housing element 90 is screwed into a screw hole in the other one of the first housing element 88 and the second housing element 90. Further, an outside bead portion 92 which is an approximately annular ring projection is provided along one side (the upper side in FIG. 4) of the circumference portion of the first housing element 88, while an approximately annular ring-shaped outside step portion 94 is provided along one side (the down side in FIG. 4) of the circumference portion of the second housing element 90, and the tip surface of the outside bead portion 92 is in contact with the side surface (the lower surface in FIG. 4) of the outside step portion 94. The portion at which the outside step portion 94 and the outside bead portion 92 are in contact with each other constitutes a connection portion 96.

Further, a labyrinth seal portion 100 is configured such that an inner bead portion 98 which is an approximately annular ring projection projecting along the axis direction (the vertical direction in FIG. 4) of the housing 42 is provided on one side surface (the lower surface in FIG. 4) of the second housing element 90 on the inner side of the outside step portion 94 along the radial direction, and that the tip surface of the inner bead portion 98 is caused to face one surface (the upper surface in FIG. 4) of the first housing element 88 via a gap. Namely, the labyrinth seal portion 100 is provided on the inner side of the connection portion 96 along the radial direction of the housing 42. As such, even if water enters inside from outside via the connection portion 96, it is possible to effectively prevent water from entering inside the flow path forming pressure chamber 56 and the atmosphere pressure chamber 54 by the labyrinth seal portion 100.

Further, the outer circumference end portion of the sub diaphragm 48 is located in a gap constituting the labyrinth seal portion 100 between the inner bead portion 98 and the outside bead portion 92 along the radial direction of the housing 42. The outer circumference end portion of the sub diaphragm 48 is tightly held between the first housing element 88 and the second housing element 90.

Further, the first housing element 88 constituting the flow path forming pressure chamber 56 and the second housing element 90 constituting the atmospheric pressure chamber 54 are made of different metals. That is, the first housing element 88 is made of stainless steel, while the second housing element 90 is made of an aluminum material or an aluminum alloy. Further, alumite processing is performed on the entire second housing element 90 including the portion constituting the connection portion 96, thereby improving the resistance to salt corrosion of the second housing element 90. The housing element tightly holding the outer circumference end portion of the main diaphragm 46 (see FIG. 2 and FIG. 3) in combination with the second housing element 90 can also be made of an aluminum material or an aluminum alloy.

Further, width W1 along the radial direction of the connection portion 96 at which the first housing portion 88 and the second housing portion 90 are in contact with each other, that is, the contact portion is made sufficiently small. For example, although the connection portion 96 includes the fastening portion configured such that, for example, the bolt is screwed into the screw hole in the part of the connection portion 96 (not shown in FIG. 4), in the connection portion 96, width W1 of a portion shifted from the fastening portion along the circumferential direction is made no greater than thickness T1 of a main body portion 102 of the first housing element 88 in the radial direction on which the pressure inside the flow path forming pressure chamber 56 is applied. Preferably, in the connection portion 96, the portion shifted from the fastening portion along the circumferential direction is a linear contact portion.

As such, because, in the present embodiment, the first housing element 88 constituting the flow path forming pressure chamber 56 and the second housing element 90 constituting the atmosphere pressure chamber 54 are made of different metals, even if the inlet shut-off valve 20 is used in a situation in which the shut-off valve 20 may get wet, such as when the inlet shut-off valve 20 is mounted on the underfloor of the vehicle, it is possible to facilitate higher achievement of both improvement in water resistance and weight saving.

Because the second housing element 90 is made of light metals such as an aluminum material or an aluminum alloy, it is possible to reduce the weight of the inlet shut-off valve 20. When the second housing element 90 is made of light metals such as an aluminum material or an aluminum alloy, and when alumite processing is performed on the second housing element 90 in order to improve the resistance to salt corrosion, cracks tend to occur on the surface of the second housing element 90, such as on the contact portion as the connection portion 96 in contact with the first housing element 88. Therefore, when the first housing element 88 is made of aluminum or aluminum alloy on which alumite processing is performed, cracks tend to overlap with each other on the connection portion 96. There is therefore demand for that the entry of water into the housing 42 be prevented. Because, in the present embodiment, stainless steel, which is different from aluminum or aluminum alloy for forming the second housing element 90, is adopted as the material for forming the first housing element 88, it is possible to effectively prevent the cracks from overlapping with each other on the connection portion 96 and easily prevent water from entering through the connection portion 96. In other words, according to the present embodiment, even when the inlet shut-off valve 20 is used in the situation in which the outside of the inlet shut-off valve 20 may get wet, it is possible to facilitate improvement in both water resistance and weight reduction.

Further, in the present embodiment, the labyrinth seal portion 100 is provided on the inner side of the connection portion 96, which is composed of the outside bead portion 92 and the outside step portion 94 which are in contact with each other, along the radial direction of the housing 42. It is therefore possible to improve the resistance of the inlet shut-off valve 20 to salt corrosion while preventing the local development of electric corrosion caused by contact between those different metals. When the first housing element 88 and the second housing element 90 are made of different metals as in the present embodiment, electric corrosion tends to develop according to the surface area ratio between the metals. In particular, when the housing element 90 is made of aluminum or aluminum alloy, and when alumite processing is performed thereon, cracks tend to occur on the surface of the second housing element 90 as described above, and, if no treatment is provided, water may enter inside from outside via the connection portion 96 at which the first housing portion 88 and the second housing portion 90 are connected. Therefore, conventionally, alumite processing has not been performed on a certain portion of an aluminum or aluminum alloy member including a contact portion at which the aluminum or aluminum alloy member comes in contact with a stainless alloy member. However, in this case, the resistance to salt corrosion of the aluminum or aluminum alloy member, that is, the second housing element 90 may be reduced.

According to the present embodiment, such a disadvantage will be overcome. Namely, according to the present embodiment, it is possible to simultaneously satisfy the following conflicting demands:

(A) in order to achieve weight saving, one element of the first housing element 88 and the second housing element 90 is made of aluminum or aluminum alloy, while the other element is made of stainless alloy, and, by performing alumite processing on the portion including the contact portion at which the one element is in contact with the other element, the resistance to salt erosion of the housing 42 is improved;

(B) water is effectively prevented from entering through the contact portion at which both elements 88 and 90 are in contact with.

Because the labyrinth seal portion 100 is provided on the inner side of the connection portion 96, which is composed of the outside bead portion 92 and the outside step portion 94 which are in contact with each other, along the radial direction of the housing 42, by making width W1 of the connection portion along the radial direction small, it is possible to increase the contact pressure of the contact portion 96 and enhance the sealing property of the contact portion 96 in addition to the superior sealing property obtained by the labyrinth seal portion 100, thereby enhancing the sealing property of the entire valve sufficiently to satisfy both demands (A) and (B) simultaneously.

It is also possible to form the housing element, which tightly holds the outer circumference end portion of the main diaphragm 46 (see FIG. 2 and FIG. 3) in combination with the second housing element 90, from a different metal from the second housing element 90 such as stainless steel. Although in the present embodiment it has been described that the housing elements in contact with each other are made using a combination of, aluminum or aluminum alloy and stainless steel, it is also possible in the present embodiment to form the housing elements in contact each other using a combination of other different metals. Further, in one or both of the outlet-shut off valve 22 and the humidifier bypass valve 18 (see FIG. 1), it is also possible to form the two housing elements constituting the different pressure chambers from different metals as in the housing 42 of the inlet shut-off valve 20. Other configurations and actions that are the same as in the above first embodiment are assigned the same codes as in the first embodiment, and their descriptions are omitted.

INDUSTRIAL APPLICABILITY

The present invention is applicable for use in a fluid control valve and a fuel cell system, specifically, in a fuel cell system which is installed in a vehicle and uses a fuel cell stack as a power supply for a vehicle driving motor.

The invention claimed is:

1. A pressure control circuit for a fluid control valve, the pressure control circuit comprising the fluid control valve and a pressure controlling flow path for supplying and discharging a fluid for pressure control to the fluid control valve, wherein:

the fluid control valve comprises a valve member having a drive shaft, the fluid control valve used in a gas flow path for supplying or discharging oxidation gas related gas or fuel gas related gas as reactant gas of a fuel cell, for blocking or connecting the flow in a gas flow path by a displacement of the drive shaft;

the drive shaft is driven by both a first force acting due to a pressure difference between a first pressure chamber and a second pressure chamber that are separated from each other, and a second force acting in the same direction as the first force and acting due to a pressure difference between a third pressure chamber and a fourth pressure chamber that are separated from each other;

in the fluid control valve, the first pressure chamber is the gas flow path in which the flows are blocked or connected by the valve member, while the second pressure chamber is open to the atmosphere;

one of the third chamber and the fourth chamber receives pressure from gas which is the same and is supplied from the same supply side as the gas flowing in the gas flow path, while the other one of the third pressure chamber and the fourth pressure chamber is open to the atmosphere;

the pressure controlling flow path comprises a main gas flow path which is a gas flow path in which flows are blocked or connected by a valve member, pressure controlling branch flow paths which are branched from the main gas flow path, and a compressor provided on an upstream side of the pressure controlling branch flow path and the main gas flow path;

the pressure controlling branch flow paths include a branch flow path on the third pressure chamber side which is connected to the third pressure chamber, a branch flow path on the fourth pressure chamber side which is connected to the fourth pressure chamber, and a three-way solenoid valve provided at a branching portion between the branch flow path on the third pressure chamber side and the branch flow path on the fourth pressure chamber side of the pressure controlling branch flow paths; and the branch flow path on the third pressure chamber side and the branch flow path on the fourth pressure chamber side are selectively open to the atmosphere by different solenoid valves.

2. A fluid control valve comprising a valve member having a drive shaft, the fluid control valve used in a gas flow path for supplying or discharging oxidation gas related gas or fuel gas related gas as reactant gas of a fuel cell, for blocking or connecting the flow in a gas flow path by a displacement of the drive shaft, wherein the drive shaft is driven by both a first force acting due to a pressure difference between a first pressure chamber and a second pressure chamber that are separated from each other, and a second force acting in the same direction as the first force and acting due to a pressure difference between a third pressure chamber and a fourth pressure chamber that are separated from each other, wherein a member constituting the first pressure chamber and a member constituting the second pressure chamber are made of different metals, wherein one of a member constituting the first pressure chamber and a member constituting the second pressure chamber is made of aluminum or aluminum alloy, and the other member is made of a different metal from the one member, and wherein alumite processing is performed on the entire surface of the one member including a contact portion at which the one member is in contact with the other member, and a contact surface of the one member, on which the alumite processing is performed and the one member is in contact with the other member, is in contact with a contact surface of the other member on which the alumite processing is not performed.

3. The fluid control valve according to claim 1, wherein a resilient sealing portion tightly holding a resilient member between the one member and the other member is provided on the inner side in the radial direction of the contact portion between the one member and the other member.

4. The fluid control valve according to claim 3, wherein the resilient member serves to deform when receiving pressure from the gas and constitutes part of a diaphragm for separating the first pressure chamber and the second pressure chamber.

5. The fluid control valve according to claim 2, wherein the thickness of the contact portion of the other member, on which the other member is in contact with the one member, is made smaller along the radial direction than the thickness of other portions of the other member along the radial direction.

* * * * *

UNITED STATES PATENT AND TRADEMARK OFFICE
CERTIFICATE OF CORRECTION

PATENT NO. : 8,439,328 B2
APPLICATION NO. : 12/513587
DATED : May 14, 2013
INVENTOR(S) : Takeshita Page 1 of 1

It is certified that error appears in the above-identified patent and that said Letters Patent is hereby corrected as shown below:

In the Specifications:
Column 13, line 33: Delete "force F1" and insert therefor --force F1'--;

In the Claims:
Column 20, claim 3, line 9: Delete "according to claim 1" and insert therefor --according to claim 2--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,439,328 B2  Page 1 of 1
APPLICATION NO. : 12/513587
DATED : May 14, 2013
INVENTOR(S) : Masahiro Takeshita It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this
Eighth Day of September, 2015

Michelle K. Lee
*Director of the United States Patent and Trademark Office*